F. SMITH AND T. H. BRITTAIN.
AUTOMOBILE TIRE MOLDING CORE.
APPLICATION FILED APR. 8, 1920. RENEWED DEC. 16, 1920.

1,366,290.

Patented Jan. 18, 1921.
2 SHEETS—SHEET 1.

Inventors
Fred Smith and
Thomas H Brittain

Knight Bros.
Attorneys

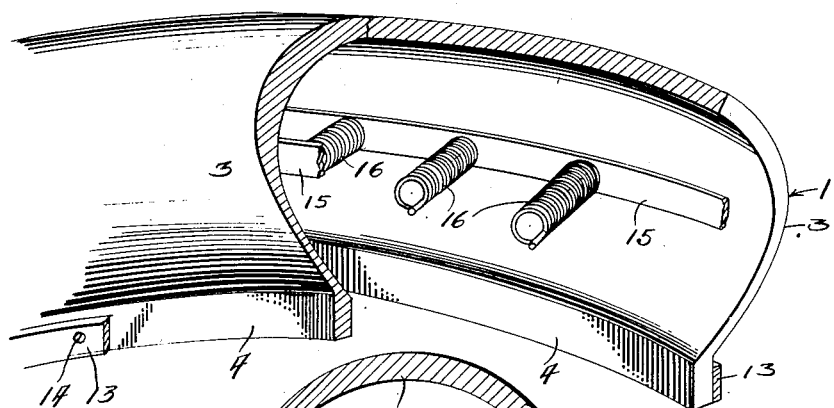
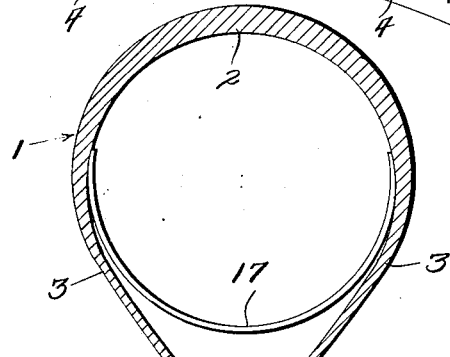
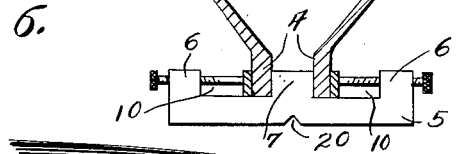
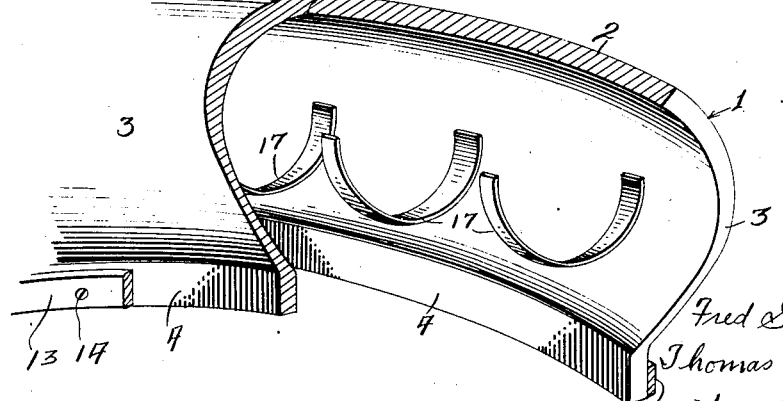

UNITED STATES PATENT OFFICE.

FRED SMITH AND THOMAS H. BRITTAIN, OF AKRON, OHIO.

AUTOMOBILE-TIRE-MOLDING CORE.

1,366,290.   Specification of Letters Patent.   Patented Jan. 18, 1921.

Application filed April 8, 1920, Serial No. 372,309. Renewed December 16, 1920. Serial No. 431,277.

*To all whom it may concern:*

Be it known that we, FRED SMITH and THOMAS H. BRITTAIN, citizens of the United States, and residents of Akron, in the county of Summit, State of Ohio, have invented certain new and useful Improvements in Automobile-Tire-Molding Cores, of which the following is a specification.

Our invention relates to automobile tire molding cores, and has for its primary object to provide a core which will efficiently apply an even pressure at all points while the tire casing is being molded thereon.

It is customary in the manufacture of automobile tires, to assemble the layers of fabric and rubber upon a core member which, in cross-section, corresponds to the cross-sectional shape of the finished outer casing of an automobile tire, and thereafter to place the core containing the assembled tire casing within a molding machine, which applies pressure upon the outer surface of the tire casing and at the same time heats the casing to vulcanize and unite the parts. During this vulcanizing process it is necessary that the core member resist the pressure applied by the molding machine, in order that the various parts may be thoroughly united.

Various types of cores have been used, but the disadvantages of the universal type of core member is, that it does not exert an even pressure against the inner surface of the tire casing, and consequently the molding machine applies a greater amount of pressure at certain points, throughout the tire casing, with the result that imperfect portions are formed by reason of the failure of the rubber and fabric to vulcanize.

We have designed a core member which will resist the pressure of the mold in a uniform manner, thereby exerting the desired pressure to the tire casing at all points, with the result that the vlucanizing process takes place uniformly throughout, thereby eliminating the imperfect portions by reason of its failure to properly vulcanize.

Many other objects will appear hereinafter in the specification and in the drawings, in which—

Fig. 4 is a fragmentary, perspective view, partly in section, of the form of our invention shown in Fig. 1;

Fig. 5 is a transverse, sectional view, similar to Fig. 1, showing a modified form of our invention; and Fig. 6 is a fragmentary, perspective view, partly in section, of the form of invention shown in Fig. 5.

Referring now more particularly to the form of invention shown in Figs. 1 to 4, inclusive, numeral 1 represents a spring metal core member, conforming in shape to the cross-section of the usual automobile tire casing. This spring metal core member is formed substantially thicker at its outer edge or thread portion, as shown at 2, the core member being tapered to form substantially thin side portions 3, which terminate in inner bead-like edges 4, somewhat greater in thickness than the side portions 3, as clearly shown in Fig. 1.

Figure 1:
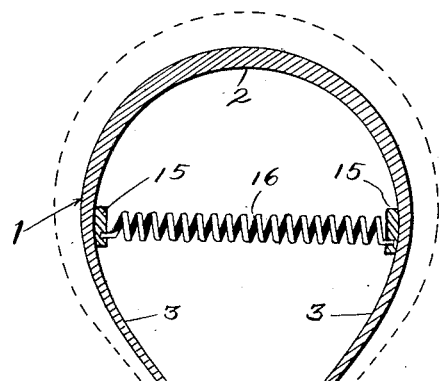
Figure 1 is a transverse, sectional view of the preferred embodiment of our invention.
Figure 2:
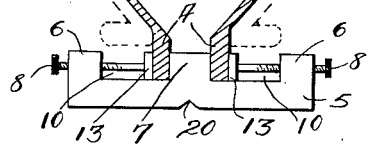
Fig. 2 is a side elevation, partly in section, of our invention.
Figure 2:
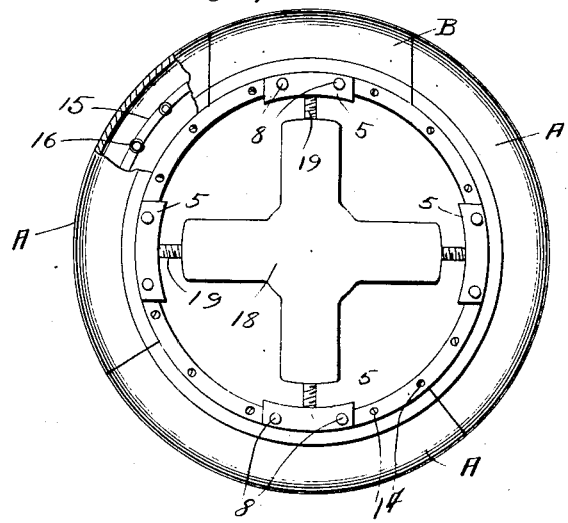

We provide, as shown in Figs. 1 and 2, guide members, indicated as at 5, for the purpose of holding the core member substantially rigid while the casing is being constructed thereon. These guide members are substantially U-shaped in cross-section, as indicated clearly in Fig. 1, having upturned side portions 6, and being provided with a central ridge or abutment 7. Set screws 8 are positioned in the upturned side portions 6, and these set screws project inwardly toward the ridge 7, for a purpose to be hereinafter more fully described.

As shown clearly in Fig. 1, the beaded edges 4 of the spring metal core member 1 are adapted to be positioned in the channels 10, formed by the upturned side portions 6 and the central ridge 7 of the guide members 5. With these beaded edges 4 in this position, the set screws 8 may be tightened to clamp the beaded edges against the ridge 7, thereby holding the core member 1 substantially rigid to facilitate the construction of the tire casing thereon.

The core member is formed of four sections, as clearly shown in Fig. 2, three of these sections (marked A) being of substantially the same length, and the fourth section (marked B) being substantially shorter in length, to act in the nature of a key section.

Figure 3:
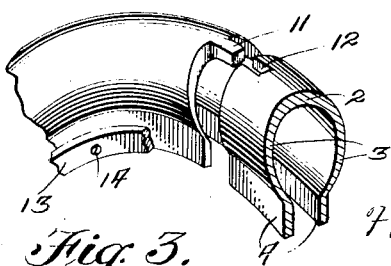
Fig. 3 is a fragmentary, perspective view of the means for joining the sections of the core member.

The abutting edges of the sections are provided, respectively, with a projecting tongue 11 and a receiving recess 12, as clearly shown in Fig. 3. In this manner the outer edge or tread portion of the sections of the core member are united to allow for certain radial movement, but prevent independent transverse vertical displacement of these sections.

In order to more securely unite the sections, we provide an integral ring 13, secured to the bead members 4 in any suitable manner, here shown by means of screws 14. By so connecting the four sections of the core, they form a unitary structure which may be handled as an entirety, but which may be quickly disassembled and one or more sections replaced, if necessary.

Arranged circumferentially of each section of the tire core is a pair of spring end-securing members 15, adapted to receive the ends of coil springs 16 arranged transversely thereof. These members 15 and coil springs 16 are adapted to be positioned substantially centrally of the tire core member, as shown in Fig. 1. These members 15 may be secured in any suitable manner to the inner face of the tire core sections, it being understood that each section is provided with a set of the securing members 15 connected by the transverse spring 16, as clearly shown in Figs. 1 and 4. When, therefore, pressure is applied in an adverse radial direction by the molding machine, the coil springs 16 will assist the spring core member 1 to resist such pressure, and will in turn exert a corresponding radial pressure, which will be uniform in all directions.

Referring now more particularly to Figs. 5 and 6, it will be seen that we have provided a series of substantialy U-shaped spring bands 17, having their ends secured substantially mid-way of the core member and to the inner face thereof. These springs also may be secured in any suitable manner, but we have here shown them as being brazed to the core member 1. The manner of operation of these spring members 17 is substantially the same as that of our preferred embodiment, the springs 17 assisting the spring metal core member in resisting the adverse radial pressure applied thereto.

By referring to Fig. 2 it will be seen that the usual spider arrangement 18, having adjustable radially projecting arms 19, may be used in combination with the guide members 5, a V-shaped groove 20 being provided upon the under side of the guide members 5 for this purpose. In constructing the tire casing, the core member may be secured rigidly, as hereinbefore described, by the guide members 5 and thereafter positioned upon the spider 18, so that the core member may be conveniently handled. However, when the core member, with the constructed casing thereon, is inserted in the molding machine, the set screws 8 are reversed, thereby freeing the beaded ends 4 of the core to allow the core member to exert the uniform radial pressure which is desired.

From the foregoing it will be seen that we have provided a core member which efficiently supplies the proper radial pressure, and which is simple in construction and durable in quality. By providing our core member in sections we are enabled to economically repair the same, as it is obvious that various sections may be replaced should they become worn and lose the resilient qualities which are necessary in a structure of this sort. The method of joining the abutting faces of the core sections, together with the integral ring member, enables us to retain the advantages of an integral structure, while eliminating the many disadvantages of such a structure.

We have found that a core member formed of spring metal substantially of greater diameter at the tread portion than at the sides thereof, and provided with beaded edges of a thickness substantially the same as that of the tread portion, will alone give us an efficient core member having the desired resilience. This is so by reason of the fact that the greatest amount of pressure in the molding machine is applied to the side portions thereof, and the molding being thinner at this point causes the same to have the proper amount of resilience.

The addition of the springs for assisting the core member in applying the radial pressure has great advantages, and it is obvious that numerous forms of springs may be used without departing from the spirit and scope of our invention. We do not limit ourselves to a core member of four sections, as it is also obvious that a greater or less number of sections may be used.

Having thus described our invention, what we claim is:—

1. A tire molding core, formed of spring metal and being substantially thicker at its tread portion than at the sides thereof, and springs disposed transversely of the core member, substantially as described.

2. A tire core, formed in sections, each section formed of spring metal, having its tread portion of greater thickness than the sides thereof, springs disposed transversely of said sections, and means for uniting said sections, substantially as described.

3. A tire core member, formed in sections, means for uniting the abutting edges of the sections, each section being formed of spring metal and having the sides thereof of a thickness less than that of the tread portion, coil springs disposed transversely of each section, and means for uniting the sections to form a unitary structure, as and for the purpose set forth.

4. A tire molding core, comprising a multiplicity of sections, each section being formed of spring metal and provided with a tread portion of greater thickness than the sides thereof, beads formed on the inner edges of said sections and of a thickness corresponding to the tread portion of the core member, a pair of spring-retaining strips in each section connected transversely by a series of coil springs, integral ring members secured to the bead portions of the core sections for uniting the sections to form a unitary structure, as and for the purpose set forth.

5. A tire molding core formed of spring metal and being substantially thicker at its tread portion than at the sides thereof, substantially as described.

6. A tire molding core formed in sections, each section formed of spring metal, and having its tread portion of a greater thickness than the sides thereof, and means for uniting said sections, substantially as described.

FRED SMITH.
THOMAS H. BRITTAIN.